Nov. 4, 1958     S. W. NAYLOR     2,858,620
APPARATUS FOR CONDITIONING GRAIN

Filed Jan. 24, 1955     3 Sheets-Sheet 1

Inventor
Straut W. Naylor
By McCanna and Morsbach
Attys.

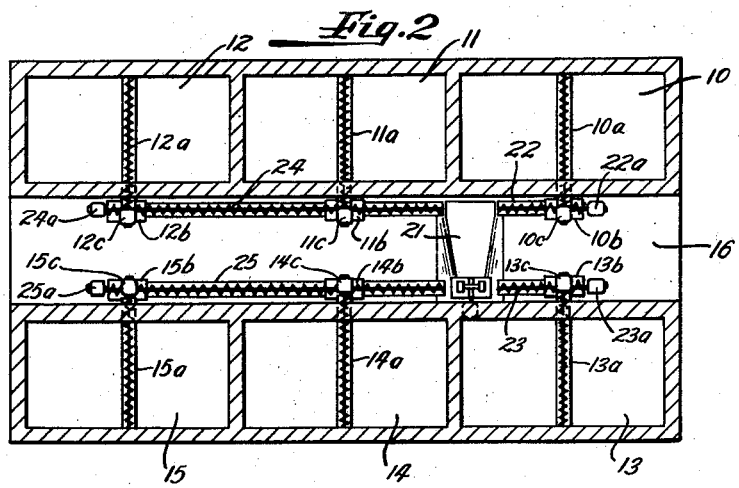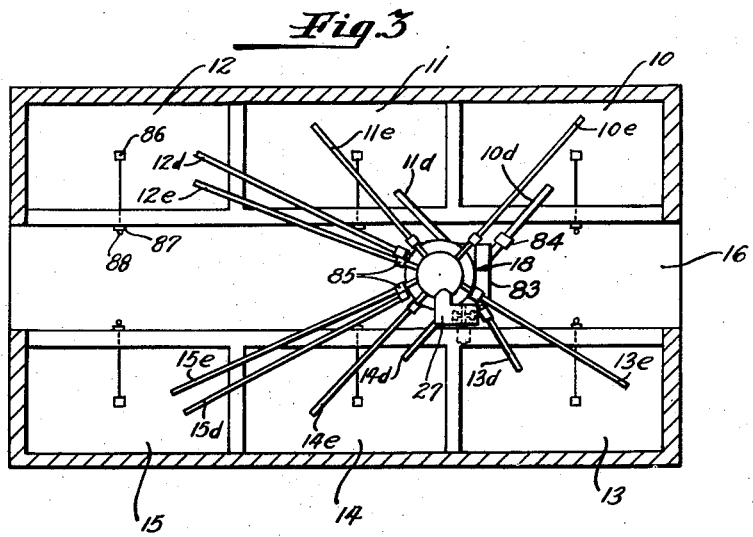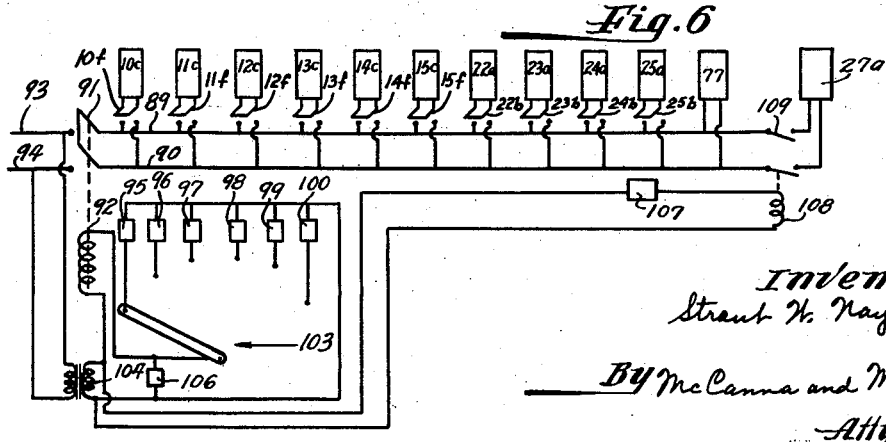

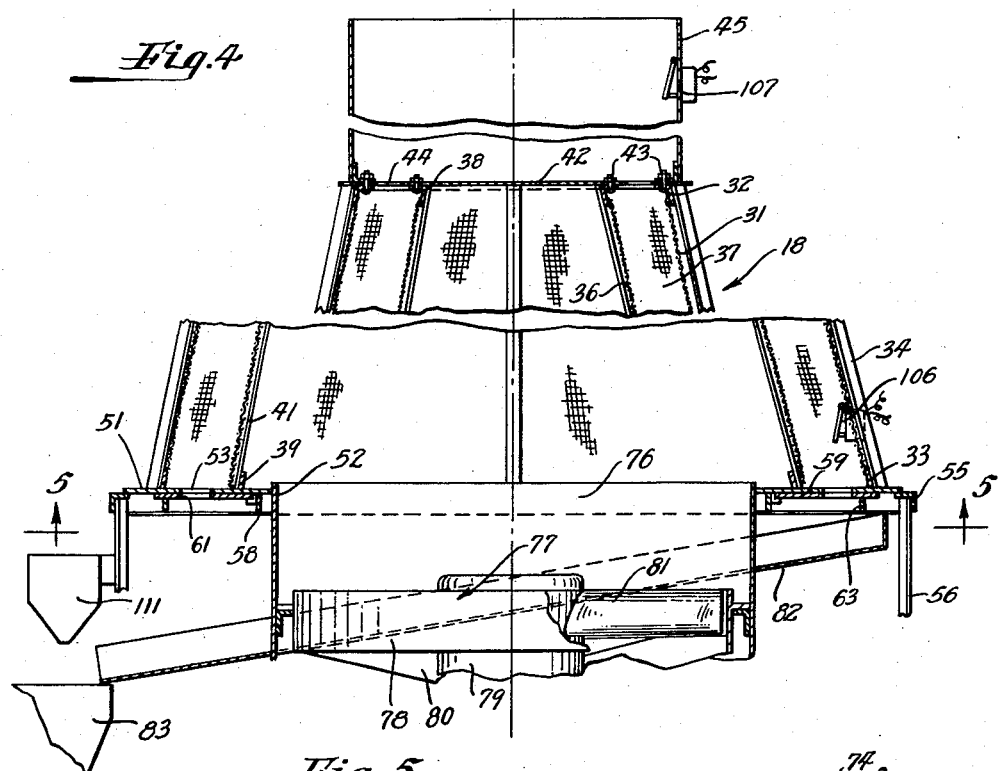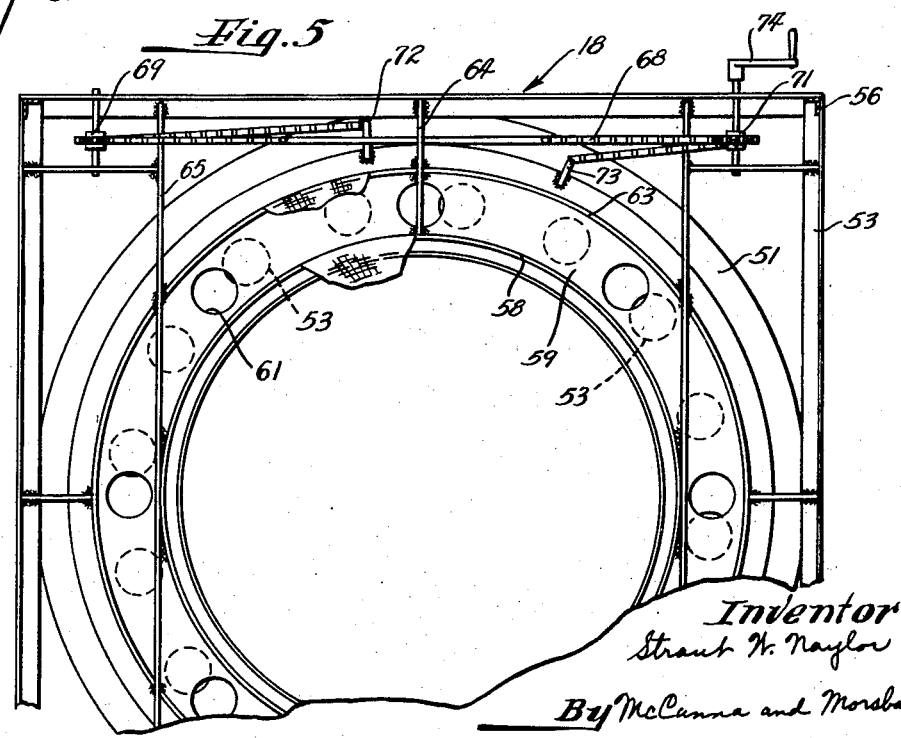

2,858,620
APPARATUS FOR CONDITIONING GRAIN

Straut W. Naylor, Dixon, Ill.

Application January 24, 1955, Serial No. 483,594

10 Claims. (Cl. 34—56)

This invention relates to the preservation of grain seeds and more particularly to a novel method and apparatus for conditioning grain seeds for storage.

It is generally necessary in the conditioning of grain seeds to reduce the moisture content of the seeds, not only for the purpose of enabling safe storage but also to enable proper milling of the seeds. As is well known, grain seeds are living organisms which respire and give off heat. When the grain seeds are stored in a confined mass, this heat is not dissipated and the mass of the stored grain will consequently be mildly heated. If the stored grain has a high moisture content, a warm and moist condition will exist in the mass of stored grain, which condition is highly conducive to the growth of molds, insects and bacteria in the grain. The growth of these micro-organisms in the mass of grain produces a marked heating of the grain, and as the growth of these micro-organisms generally begins at spots in the mass of grain, localized heating referred to as "hot spots" results, which heating, if uncontrolled, will spread to the entire mass of grain. These hot spots, produced as a result of the growth of micro-organisms in the grain and attributed to the respiration of these micro-organisms, cause damage to the grain, not only due to the attacking of the grain by the micro-organisms but also due to the excessive heating of the grain, which overheating itself produces deleterious effects on the grain.

The depredations incurred in naturally drying grain in the fields or in drying corn on the cob, due to exposure to weather and by rodents and the like, and changes in agronomic practices have resulted in the harvesting much of the grain at high moisture content. It is therefore necessary to artificially dry the grain to permit safe storage. The present practice of artificially drying grain by passing heated air through the grain to drive off the moisture has certain disadvantages since the quality of the grain can be seriously impaired by overheating with the heated air, or by drying the grain too much or too fast. This may cause chemical and/or physical changes in the grain which reduces the quality of the materials produced therefrom and also renders processing of the grain more difficult.

In addition to the aforementioned disadvantages in kiln drying of grain with heated air, it is necessary to provide an external heat source for heating the air for the dryer, which heat source not only increases the cost of the drying apparatus but also increases the expense of operation. Further, the grain as it leaves the kiln dryer is heated so that it is conducive to the growth of insects and the like in the grain. It is therefore common practice to also provide apparatus for cooling the grain after it has been dryed in the kiln and before it is stored, thus further increasing the cost of artificial drying apparatus.

It is an important object of this invention to provide a novel method and apparatus for drying of moist grains which overcomes the aforementioned disadvantages of the kiln drying and natural drying methods for the conditioning of grain.

Another object of this invention is the provision of a novel system for drying grain seeds after harvesting, which grain drying system does not require an external heat source.

A further object of this invention is the provision of a grain drying system which simultaneously effects drying and cooling of the grain whereby the grain, after drying, is ready for storage.

A further object of this invention is the provision of a novel grain drying apparatus which facilitates removal of grain from one conditioning bin, drying and cooling the grain, and returning the grain to a different conditioning bin.

Yet another object of this invention is the provision of an improved drying apparatus for grain which will efficiently and economically dry the grain.

These, together with various ancillary objects and advantages of this invention will be more readily appreciated as the same becomes better understood by reference to the following detailed description when taken in connection with the accompanying drawings wherein:

Fig. 2 is a horizontal sectional view taken on the plane 2—2 of Fig. 1 illustrating the conveyer apparatus for feeding grain from the conditioning bins to the elevator;

Fig. 3 is a horizontal sectional view taken on the plane 3—3 of Fig. 1 with the roof of the conditioning building removed illustrating the distribution system for returning the grain from the dryer and elevator to the conditioning bins;

Fig. 4 is a vertical sectional view through the grain dryer taken on the plane 4—4 of Fig. 1;

Fig. 5 is a horizontal sectional view taken on the plane 5—5 of Fig. 4, and

Fig. 6 is a schematic diagram illustrating semiautomatic control for the dryer.

Figure 1:
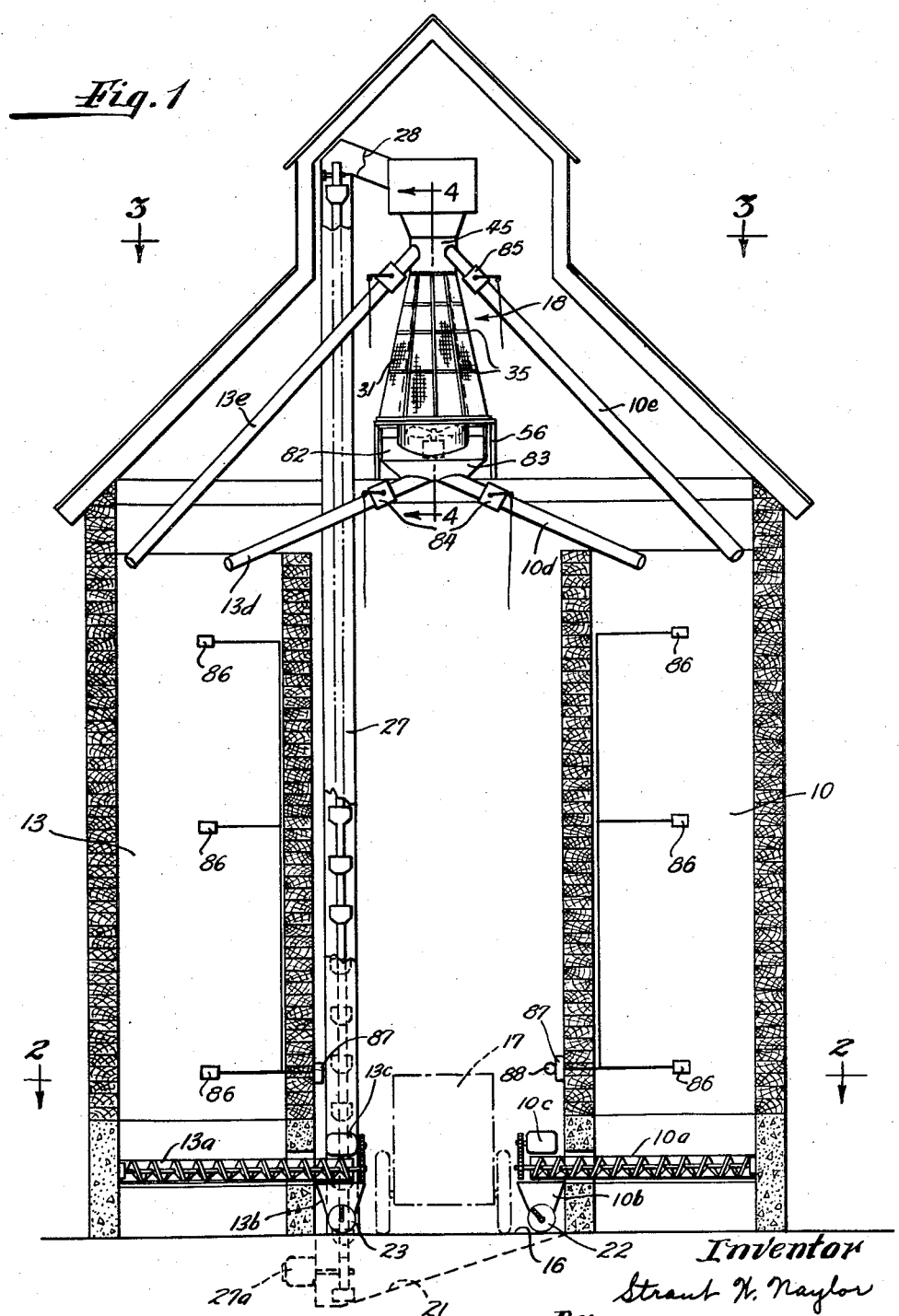
Figure 1 is a vertical sectional view through a grain conditioning building showing the conditioning bins and the dryer apparatus.

The grain conditioning apparatus of the present invention is intended for use generally in the drying of moist grain seeds, such as corn, wheat, soy beans, rice and the like, when the grains, as harvested, have a moisture content above that which will permit safe storage or proper milling, the specific storage and drying apparatus herein illustrated being particularly designed for the conditioning of corn. In general, the conditioning apparatus comprises a plurality of conditioning bins here shown as six in number and designated 10—15. The bins may be conveniently arranged in rows along opposite sides of the building, as illustrated in Figs. 2 and 3 to provide an areaway 16 therebetween through which grain may be hauled into and out of the building as by wagons 17. A drying apparatus indicated generally by the numeral 18 is provided for drying the grain and, in accordance with the present invention, is located adjacent the top of the conditioning bins, as is clearly shown in Fig. 1.

A conveyer and elevator system is provided for selectively withdrawing grain from one of the conditioning bins and elevating the grain to the dryer, a distributing system being provided for conveying the grain from the dryer back to one of the conditioning bins. As illustrated in the drawings, a plurality of screw type conveyors 10a—15a are located adjacent the bottom of each of the bins 10—15 for withdrawing grain from the respective bins and depositing the grain in hoppers 10b—15b respectively. Conveniently, separate motors 10c—15c are provided for driving each of the respective conveyors.

An elevator hopper 21 is provided in the area-way 16 for receiving grain discharged from the wagon 17 and also for receiving grain conveyed thereto from any one of the several conditioning bins. As best shown in Figs. 1 and 2, conveyers 22 and 23, conveniently driven by separate motors 22a and 23a, respectively, are provided for conveying the grain seed from the hoppers 10b and 13b to the elevator hopper 21. Similarly, conveyers 24 and 25, driven by motors 24a and 25a, are provided for conveying the grain from the hoppers 11b and 12b and from the hoppers 14b and 15b to the elevator hopper 21.

An elevator 27, of any conventional construction, and driven by a motor 27a, is provided for elevating the grain from the hopper 21 to a point above the drying apparatus 18, a chute 28 being provided to convey the grain from the upper end of the elevator to the drying apparatus.

The drying apparatus 18, best shown in Figs. 4 and 5, is arranged to continuously dry the grain as it is passed therethrough. In accordance with the present invention, the drying apparatus includes an outer perforate frusto-conical member 31 formed of a foraminous or reticulated screen construction and having annular reinforcing members 32 and 33 at the upper and lower ends thereof. A plurality of circumferentially spaced longitudinally extending brace members 34 are secured to the upper and lower members 32 and 33 to support and reinforce the screen and a plurality of axially spaced annular reinforcing members 35 (see Fig. 1) are secured to the longitudinally extending members, intermediate the ends thereof. An inner frusto-conical perforated member 36 is disposed within the outer member in spaced relation thereto to provide a drying chamber 37 therebetween. The inner screen is also provided with upper and lower annular reinforcing members 38 and 39 respectively which are interconnected by circumferentially spaced longitudinally extending brace members 41. A plate 42 is secured to the upper ends of the inner and outer screens 36 and 31, as by fasteners 43, which plate closes the upper end of the inner screen member and has a plurality of annularly spaced ports 44 formed therein between the inner and outer screens to distribute the grain seeds uniformly around the upper end of the drying chamber 37. A hopper 45 is secured to the plate 42 and extends upwardly therefrom to receive grain discharged through the chute 28 from the elevator, as is clearly shown in Fig. 1. An annular stationary valve plate 51 is secured to the lower ends of each of the inner and outer screens 36 and 31 and has a central opening 52 of a diameter substantially equal to the major diameter of the inner screen. A plurality of annularly spaced discharge ports 53 is formed in the plate 51, between the inner and outer screen members to permit discharge of grain from the chamber 37.

The stationary valve plate 51 is secured to, and supported on a rectangular frame 55 formed of angle iron or the like to which are secured a plurality of upstanding support legs 56 which support the dryer on the building frame. Provision is made for regulating the rate of flow of grain seeds from the drying chamber to provide the desired "drying time" during which the grain is in the dryer. For this purpose, an anuular depending guide band 58 is secured, as by welding, to the underside of the plate 51 adjacent the central opening 52 thereat and an annular rotatable valve plate 59 is rotatably disposed around the band 58. The rotatable valve plate 59 underlies the stationary plate and has a plurality of uniformly spaced ports 61 formed therein, of a diameter equal to the diameter of the ports 53 in the stationary valve plate and adapted to register therewith to control the flow of grain from the chamber 37. An annular valve plate supporting band 63 underlies the valve plate 59 adjacent the outer periphery thereof, which support band is secured by brace bars 64 and 65 to the guide band 58 and to the frame 55.

Since proper flow of grain requires an open port area which is large as compared to the size of the grain seeds to prevent clogging of the ports, the ports 53 are made relatively large and the spacing between the ports made such that substantially complete emptying of the drying chamber can be effected when all of the ports in the stationary plate are opened. In order to regulate the rate of flow through the ports in the stationary plate for low flow rates without making the open area of these ports so small as to produce clogging of the ports by the grain, the number of ports in the rotary valve plate 59 is made a sub-multiple of the number of ports in the stationary valve plate 51 and, as shown in the drawings, the lower rotatable plate has one-half as many ports as the stationary plate. Consequently, only alternate ports in the stationary valve plate can be uncovered at any one time so that a relatively wider opening of the other ports in the stationary plate may be used for any given flow rate.

Provision is made for selectively adjusting the angular position of the rotatable plate 59 with respect to the upper plate 51, which means includes a sprocket chain 68 which is entrained intermediate its ends over sprockets 69 and 71 and wheich is terminally attached, by lugs 72 and 73 to the periphery of the rotatable plate 59. A crank 74 is provided for rotating one of the sprockets 71 to oscillate the chain and thereby shift the angular position of the rotatable plate. In this manner the effective open area of alternate ports in the top plate can be selectively controlled to adjust the rate of flow of grain from the lower end of the chamber 37. This, in turn, regulates the amount of time required for the grain to pass from the upper end of the chamber 37 and out through the bottom thereof and thus affects the duration of time that the grain is exposed to the drying action. The rotatable plate 59 is also adjustable relative to the upper plate to a position in which the alternate ports which were closed during the drying operation by the plate 59 may be opened to permit discharge of grain therethrough. This enables more complete removal of the grain from the dryer, at the completion of a run.

A cylindrical fan housing 76 is disposed in the central opening 52 in the upper plate 51 and a fan 77 is mounted in the housing, axially of the inner and outer frusto-conical screen members, to direct air upwardly thereinto. As shown in Fig. 4 the fan includes a shroud ring 78 on which the motor 79 is mounted by arms 80, and a rotor, including a plurality of blades 81, is rotatably mounted on the motor within the fan shroud. An inclined tray 82 is secured to the fan housing 76, which tray underlies the discharge openings at the lower end of the drying chamber and conveys the grain to a distribution hopper 83.

The fan 77 directs a stream of air upwardly into the inner frusto-conical member. The conical shaped dryer chamber provided between the inner and outer frusto-conical members provides more efficient and economical drying of the grain in the relatively short length of the dryer. As is apparent, from Fig. 4, the conical drying chamber surrounds the stream of air produced by the fan and extends inwardly into the air stream so that velocity of the air stream forces the latter through the grain in the chamber. This minimizes the static pressure built up within the inner screen and increases the quantity of air which flows through the grain to dry and cool the same. Moreover, the grain, as it flows down through the drying chamber, is tumbled by contact with the inner screen member and other grain kernels and this provides more complete exposure of the grain to the air flowing through the chamber. In addition, it is to be noted that the grain at the top of the dryer chamber moves downwardly at a relatively higher rate than the grain at the lower end of the chamber. Consequently, the grain, which is relatively hot and moist as it enters the top of the dryer chamber, moves rapidly downwardly whereas the grain in the lower portion of the chamber, which is dryer and cooler than the grain at the top, moves progressively more slowly. It has been noted in practice that most of the moisture which is removed in the drying process, is removed adjacent the top of the dryer. The conical configuration of the dryer chamber which progressively slows down the rate of flow of grain downward in the chamber, thus provides a prolonged exposure time for cooling the grain.

The dryer is thus arranged to efficiently dry the grain in a relatively short path of travel of the grain. Consequently, the dryer is particularly adapted to be mounted above the conditioning bins so that the grain may be fed from the dryer by gravity back into a conditioning bin. This eliminates the necessity of providing a separate elevator for conveying the grain from the dryer to the storage bin and reduces the amount of handling of the grain required in the drying process so that damage to the grain, during drying, is minimized.

As previously set forth, the dryer is arranged above the storage bins, as best shown in Fig. 1, and this enables distributing of the grain from the dryer into the preselected bin by gravity. As shown in Fig. 3, a plurality of feed conduits 10d—15d extend from the hopper 83 outwardly into the respective bins 10—15. Suitable valves 84 are provided in each of these conduits and are selectively operable to their open position to permit flow therethrough from the hopper into the preselected bin. The elevating and distributing apparatus is also arranged to permit elevating grain from the elevator hopper 21 and distributing the same into a preselected bin without passage through the dryer. For this purpose there is provided a second set of distributor conduits 10e—15e, respectively, each of which conduits communicates with the hopper 45 at the upper end of the dryer and have valves 85 therein, which when open permit flow therethrough to the respective bins.

The conditioning bins, elevators and drying apparatus are arranged for the conditioning of cereal grains which, as harvested, have a moisture content above that which will permit safe storage or proper processing. In accordance with the present invention, the cereal grains having a high moisture content are hauled in from the fields, after harvesting, and deposited in the elevator bin 21 from which they are elevated by the elevator 27 and delivered to the hopper 45 at the upper end of the dryer. The grain is preferably delivered directly to a conditioning bin to allow the mass of grain to become mildly heated by the respiration of the grain seeds, and for this purpose, the valve 85 in any one of the distribution conduits 10e—15e may be opened to distribute the grain to the selected bin. However, if the grain has become slightly heated during transportation from the field, the grain may advantageously be passed through the dryer before being delivered to the bin. In this event, the grain is passed from the hopper 45 through the dryer 18 at a rate determined by the opening of the ports in the plate 51 and one of the normally closed valves 84 in the conduits 10d—15d is opened to convey the grain from the dryer to a preselected bin. As the grain passes through the dryer, air at ambient temperature is blown through the grain to drive off the moisture on the surface of the grain and to cool the latter.

In accordance with the present invention, the grain is maintained in the bin in its moist condition until the normal respiration of the grain produces sufficient heating to raise the overall temperature of the mass of grain in the bin a preselected amount. For example, when drying corn, a 20° to 30° F. overall temperature rise in the mass of corn over the temperature of the mass of corn as it is stored in the bin, or over the ambient temperature if that is above the temperature of the grain when stored, has been used. Preferably, the temperature to which the grain is allowed to reach is made less than the temperature at which any appreciable mold growth occurs, and in practice is made of the order of 100° F. or less for corn. This overall temperature rise in the mass of grain produced by respiration of the grain, is low as compared to the temperature rises at localized spots within the grain as occurs when molds, bacteria or insects begin to grow in the grain, and does not produce any deleterious effects upon the grain stored in the bins.

The temperature rise in the mass of grain in each bin may be detected by any suitable thermoresponsive apparatus. Thus, a single thermoresponsive device may be located at a position, such as in the center of the mass of grain, where it will produce a signal correlative with the average temperature rise in the mass of grain, or alternatively, a thermoresponsive device may be mounted on a probe and inserted at various points in the mass of grain to determine the average temperature of the latter. Preferably, a plurality of thermoresponsive devices, shown schematically in the drawings and designated 86, are provided at various points in the mass of grain. The several thermoresponsive devices in each bin are arranged to produce a signal, such as an electrical signal, correlative with the temperature measured thereby, and these signals are then averaged, as by an apparatus designated 87. The apparatus 87 may be of any suitable construction and arranged to indicate when a predetermined selectively variable average temperature is reached in the mass of grain in the respective bin. For this purpose, a signal device 88 may be associated with each of the apparatus 87 to give a visible or audible signal when a preselected mean temperature occurs in the bin. When the overall temperature of the mass rises the preselected amount, the conveyer in the respective bin is operated to withdraw the grain from that bin and the appropriate conveyer 22—25 also operated to convey the grain to the elevator hopper 21 from which it is elevated by the elevator 27 to the drying apparatus 18.

The mild heating produced by the respiration of the grain also tends to drive some of the moisture out of the seed onto the surface thereof. As the grain seeds move downwardly through the dryer, air at ambient temperature is passed upwardly through the dryer, which air drives off the moisture from the surface of the grain and also effects cooling of the latter. In practice, it has been found that the moisture content of relatively moist corn can be reduced about 1% for each 10 degree rise in temperature of the corn over the temperature of the grain when stored, each time the corn is passed through the dryer after being allowed to heat in the manner previously described. As the grain leaves the dryer, it is conveyed by one of the conduits 10d—15d to an empty conditioning bin where it is allowed to remain until the temperature thereof again rises a preselected amount above the temperature at which it was originally stored. When this condition is reached, the aforementioned cycle of withdrawing the grain from the bin, elevating the grain, and passing the grain through the dryer where it is subjected to a stream of air at ambient temperature to dry and cool the same, is repeated. The same cycle is followed for the grain stored in each of the several bins until the average moisture content of the grain in these bins is at or below the maximum moisture content in which the grain will store properly. The cycle is then interrupted and the grain allowed to either remain in the respective bins or is transferred to other storage bins if desired. If the grain is allowed to remain in the bins after being dried to the desired moisture content, it is apparent that the conveyer and drying apparatus may be used to properly handle the grain if "hot spots" occur in the grain after it has been dried, as may be caused by humid atmospheric conditions or when the grain again becomes active during a subsequent germinating season.

The aforementioned method of drying the grain seeds produces improved results. Heating of the grain 20° or 30° F. by the natural process of respiration requires a period of time which varies with the moisture content of the grain and the ambient temperature. If either the moisture content or the initial temperature of the grain is low, respiration of the grain is slow and therefore heating by this cause is also slow. The prolonged period of heating permits the heat to drive the moisture out of the grain where it condenses on the surface thereof in what is referred to as "sweating." Consequently, as the grain is passed through the dryer, the grain is at an elevated temperature and much of the moisture is on the surface thereof whereby the air, at ambient temperature, passing over the grain will collect the moisture on the grain and also effect cooling of the grain. As the air passes over the heated grain, the air becomes heated thereby and this increases the moisture collecting capacity of the air. Since the temperature to which the mass of grain is allowed to rise is low as compared to the temperature rise in the grain produced by the growth of micro-organisms, it is apparent that drying and cooling of the grain is effected before any appreciable mold or bacteria growth can occur. Consequently, the grain is not damaged by the growth of these micro-organisms. Further, this temperature is well below the safe temperature to which the grains can be subjected without causing deleterious effects in the chemical and physical structures of the grain which render processing of the same difficult and which reduce the quality of the products produced from the grain. It is also to be noted that the drying process not only dries the grain but also simultaneously effects cooling of the grain so that the latter, as it is returned to the bins, is cool. This further inhibits the growth of micro-organisms and insects and prevents damage to the grain from these causes. Since air at ambient temperature is utilized in drying the grain, it is apparent that no external heat source is required as in conventional drying apparatus and further, it is not necessary to cool the grain after the drying process, as is required in kiln drying apparatus since the claimed method simultaneously effects drying and cooling of the grain.

In the conditioning bin arrangement disclosed, a plurality of separate conditioning bins are provided, and conveyer and elevator apparatus arranged so that the grain from any selected bin can be withdrawn and passed through the dryer. This enables a single drying apparatus having a limited drying capacity to handle a relatively large quantity of grain with the disclosed drying method since the grain in each of the several bins can be sequentially passed through the drying apparatus in the order in which the mass of grain in the respective bins becomes heated a preselected amount. As shown in Fig. 6, a semi-automatic control circuit is provided for initiating the drying cycle in response to a predetermined temperature rise in the mass of grain in any one of the selected bins. Obviously, a fully automatic control system may be provided in which the grain from any one of the bins will be passed through the dryer when the temperature of the mass of grain in that bin reaches a preselected value.

As previously described, each of the bins is provided with temperature sensing apparatus which indicates the average temperature of the mass of grain in that bin. Conveniently, the semi-automatic control system, shown schematically in Fig. 6, may be operated by the temperature sensing apparatus to initiate the cycle of withdrawing grain from one bin, passing the grain through the dryer and returning the grain to another bin, when the temperature in the first mentioned bin reaches a preselected value. In the semi-automatic control system illustrated, the motor control apparatus and the valves 84 and 85 in the distributing system are manually preset, in a manner described hereinafter, in accordance with whichever bin has the highest temperature so that when the temperature of that bin reaches the preselected value, the drying cycle is initiated and the grain is drawn from that bin and passed through the dryer. As shown in Fig. 6 each of the motors 10c—15c which operate the individual bin conveyors; the motors 22a—25a which operate the conveyers for transferring the grain to the elevator hopper 21; and the elevator motor 27a and the fan motor are connected in parallel with the lines 89 and 90. A plurality of individual disconnect switches 10f—15f are provided for selectively disconnecting the motors 10c—15c and disconnect switches 22b—25b are provided for selectively disconnecting the respective conveyer motors 25a—25a. A relay operated switch 91 controlled by the relay 92 is provided for selectively connecting the lines 89 and 90 to the input power lines 93 and 94.

Provision is made for energizing the solenoid 92 when the temperature in a preselected bin reaches a predetermined value and for this purpose there is provided a plurality of temperature operated switches 95, 96, 97, 98, 99 and 100 which are respectively arranged to be operated in response to the mean temperature in the bins 10—15 respectively. Conveniently, the averaging apparatus 87 in each of the bins may be arranged to also operate the respective switches 95—100 when the average temperature in that bin reaches a preselected selectively variable value. The solenoid 92 is connected in series circuit with a multiple position switch 103 having a plurality of positions corresponding to the number of temperature operated switches for the several bins, which multiple position switch is arranged to selectively connect any preselected one of the temperature operated switches in series with the solenoid. The solenoid and the temperature operated switches are otherwise connected to a source of power as is provided by the secondary of the transformer 104, the primary of which is connected to the power lines 93 and 94.

When the temperature sensing apparatus on the several bins indicate that the temperature in one of the bins, such as bin 13, is the highest of the several bins, and yet is below the temperature at which it is desired to initiate the drying cycle, the motor control and distributor system is preset so that upon reaching the preselected temperature, the grain in this bin will be withdrawn from this bin and passed through the dryer. For this purpose, the valve 84 in the conduit 13d is opened and the switch 13f controlling motor 13c is closed. The switch 23b, which controls the motor for the conveyer 23, is also closed to effect feeding of the grain from the conveyer to the elevator hopper 21. The switch 103 is then preset to a position connecting the temperature operated switch 98 in series with the solenoid 92. When the temperature of bin 13 reaches the preselected value, switch 98 will close and a circuit will be established through the solenoid 92 energizing the same, thereby closing the switch 91. This applies power to the motors 13c and 23a which are connected by the previously closed switches 13f and 23b to the lines 89 and 90 thereby feeding the grain from bin 13 to the elevator 27. The fan motor 77 is connected to the conductors 89 and 90 and the elevator motor 27a is connected to the conductors 89 and 90 through a normally closed relay operated switch 109. The elevator motor 27a and the fan motor 77 are also energized in response to closing of switch 91 to elevate the grain to the dryer and pass air at ambient temperature through the grain as it passes through the dryer. In order to continue operation of the conveyers and elevator until all of the grain has been removed from the bin and dryer, a normally open pressure switch 106 is provided at the lower end of the dryer 18. This pressure switch is connected in parallel with the temperature operated switches 95—100 and is arranged to be closed whenever there is grain in the dryer to thereby maintain a completed circuit through the solenoid 92 until all of the grain has been removed.

Provision is made for regulating the flow of grain into the dryer in accordance with the rate at which the grain flows from the dryer. For this purpose, a normally open pressure operated switch 107 is located in the hopper 45 above the dryer, which switch is arranged to be closed when the grain therein rises to a preselected level determined by the position of the switch. The pressure switch 107 is arranged in series circuit with a solenoid 108 which may conveniently be connected to the secondary of transformer 104. The solenoid 108 operates the switch 109 in the circuit to the elevator motor 27a, to interrupt power thereto when the pressure switch is closed. In this manner, the feeding of grain by the elevator to the dryer is stopped whenever a preselected amount of grain is present in the hopper 45 above the dryer.

In order to further inhibit the growth of micro-organisms and insects in the grain, chemical distributor 111 is mounted above the distributor hopper 83 to dispense measured quantities of insecticides therein. Preferably, the insecticide treatment apparatus is operated only on the last pass of the grain through the dryer so that the insecticides will not be blown off in the dryer.

From the foregoing it is apparent that the drying system enables drying of grain seeds having a moisture content in excess of that which will permit safe storage without requiring the application of external heat and in such a manner that the grain, as it is returned to the bins, is cooled to thereby inhibit growth of micro-organisms in the grain. Moreover, the temperatures to which the grain is subjected during drying are maintained below that which would permit appreciable micro-organism growth or which would produce deleterious effects on the grain by overheating.

I claim:

1. A grain conditioning apparatus comprising a plurality of bins, a dryer, transfer means for passing grain from one of the bins through the dryer to another of the bins, means for passing air at ambient temperature through the grain in the dryer, and means responsive to a predetermined temperature rise in the grain in one of the bins for operating said transfer means.

2. A grain conditioning apparatus comprising a plurality of bins, a dryer mounted above said bins, conveyer means for withdrawing grain from one of the bins and for elevating the grain to the dryer, a chute for conveying grain from the dryer to another of said bins, and means responsive to a predetermined temperature rise in the grain in one of said bins for operating said conveyer means.

3. A grain drying apparatus comprising a plurality of conditioning bins, a dryer mounted above said bins, elevator means for conveying grain from the bins to said dryer, chutes for conveying grain from the dryer by gravity into a selected one of said bins, said dryer including inner and outer conical shaped screens defining a drying chamber therebetween, and means disposed adjacent the lower end of the inner screen for directing a stream of air axially of said dryer for flow through the grain in the drying chamber.

4. A grain drying apparatus comprising a plurality of conditioning bins, a dryer mounted above said bins, elevator means for conveying grain from the bins to said dryer, chutes for conveying grain from the dryer by gravity into a selected one of said bins, said dryer including inner and outer conical shaped screens defining a drying chamber therebetween, means disposed adjacent the lower end of the inner screen for directing a stream of air axially of said dryer for flow through the grain in the drying chamber, and valve means at the bottom of said screens for regulating the flow of grain from said chamber.

5. A grain conditioning apparatus comprising an upright outer conical shaped screen, a inner conical shaped screen disposed within said outer screen and spaced therefrom to define a frusto-conical drying chamber therebetween, means for introducing grain into the upper end of the chamber to flow therethrough and out of the bottom of the chamber, an annular plate secured to the lower ends of said inner and outer screens having discharge ports therein between said screens, a cylindrical fan housing of a diameter substantially equal to the diameter of the major end of the inner screen disposed in said annular plate coaxial with said inner screen, and a fan disposed in said housing for effecting the flow of air substantially axially through the drying apparatus.

6. A grain conditioning apparatus comprising an upright outer conical shaped screen, an inner conical shaped screen closed at the top thereof and disposed within said outer screen and spaced therefrom to define a drying chamber therebetween, means for introducing grain into the upper end of the chamber to flow therethrough and out of the bottom of the chamber, an annular plate secured to the lower ends of said inner and outer screens having discharge ports therein between said screens, a cylindrical fan housing of a diameter substantially equal to the diameter of the major end of the inner screen disposed in said annular plate, a fan disposed in said housing for directing a stream of air axially of said inner screen upwardly thereinto for passage through the drying chamber, and an inclined grain chute attached to said housing to extend therearound and underlying the ports in said annular plate.

7. A grain conditioning device comprising an upright outer frusto-conical screen tapering uniformly from the top to the bottom thereof, an inner frusto-conical screen tapering uniformly from the top to the bottom thereof and disposed within said outer screen in spaced relation thereto and defining a chamber therebetween, a plate affixed to the upper ends of said inner and outer screens and having a plurality of annularly spaced openings therein located between said inner and outer screens, a hopper attached to said plate and extending upwardly therefrom, an annular bottom plate attached to the lower ends of said inner and outer screens having an enlarged central opening therein located within said inner screen and a plurality of annularly spaced openings located between said inner and outer screens, and a cylindrical housing attached to said bottom annular plate around said central opening therein and extending downwardly therefrom.

8. A grain conditioning device comprising an upright outer frusto-conical screen tapering uniformly from the top to the bottom thereof, an inner frusto-conical screen tapering uniformly from the top to the bottom thereof and disposed within said outer screen in spaced relation thereto and defining a chamber therebetween, a plate affixed to the upper ends of said inner and outer screens and having a plurality of annularly spaced openings therein located between said inner and outer screens, a hopper attached to said plate and extending upwardly therefrom, an annular bottom plate attached to the lower ends of said inner and outer screens having an enlarged central opening therein located within said inner screen and a plurality of annularly spaced openings located between said inner and outer screens, a cylindrical housing attached to said bottom annular plate around said central opening therein and extending downwardly therefrom, and a grain chute attached to said housing to extend therearound below said annularly spaced openings in said annular bottom plate, said chute being disposed in a plane inclined to the axis of said screens to convey the grain therefrom to a position at one side of said housing.

9. A grain conditioning device comprising an upright outer frusto-conical screen tapering uniformly from the top to the bottom thereof, an inner frusto-conical screen tapering uniformly from the top to the bottom thereof and disposed within said outer screen in spaced relation thereto and defining a chamber therebetween, a plate affixed to the upper end of said inner screen, a hopper attached to the upper end of said outer screen and extending upwardly therefrom, an annular bottom plate attached to the lower ends of said inner and outer screens having an enlarged central opening therein located within said inner screen and a plurality of annularly spaced openings located between said inner and outer screens, a cylindrical housing attached to said annular bottom plate around said central opening therein and extending downwardly therefrom, an annular valve plate disposed around said housing and underlying said bottom plate, a rigid support frame attached to said bottom plate and disposed radially outwardly from said valve plate for supporting said grain conditioning device, an annular guide ring attached to said frame and said bottom plate and underlying said valve plate to rotatably support the latter, said valve plate having a plurality of openings therein, and means attached to said valve plate for selectively turning the latter relative to said bottom plate.

10. The combination of claim 9 wherein the number of ports in the rotatable plate is a sub-multiple of the number of ports in the stationary plate.

References Cited in the file of this patent

UNITED STATES PATENTS

| | | |
|---|---|---|
| 56,708 | Clark | July 31, 1866 |
| 921,395 | Hager | May 11, 1909 |
| 1,094,452 | Mayo et al. | Apr. 28, 1914 |
| 2,073,553 | Dienst | Mar. 9, 1937 |
| 2,245,664 | Gronert | June 17, 1941 |
| 2,591,173 | Marken | Apr. 1, 1952 |
| 2,641,063 | Greiman | June 9, 1953 |
| 2,655,734 | Ohlheiser | Oct. 20, 1953 |

FOREIGN PATENTS

| | | |
|---|---|---|
| 588,616 | Great Britain | May 29, 1947 |